US006901163B1

United States Patent
Pearce et al.

(10) Patent No.: US 6,901,163 B1
(45) Date of Patent: May 31, 2005

(54) METHOD OF DETECTING OBJECTS

(75) Inventors: Henry Colin Pearce, Uxbridge (GB); Martin Bertram Bone, Buckinghamshire (GB); Christopher Lewis Read, London (GB)

(73) Assignee: Active Silicon Limited, Uxbridge (GB)

( * ) Notice: Subject to any disclaimer, the term of this patent is extended or adjusted under 35 U.S.C. 154(b) by 0 days.

(21) Appl. No.: 09/701,128

(22) PCT Filed: Mar. 29, 1999

(86) PCT No.: PCT/GB99/00980

§ 371 (c)(1),
(2), (4) Date: Jul. 23, 2001

(87) PCT Pub. No.: WO99/60353

PCT Pub. Date: Nov. 25, 1999

(30) Foreign Application Priority Data

May 19, 1998 (GB) ............................................. 9810771

(51) Int. Cl.$^7$ ............................. G06K 9/00; G06K 9/68
(52) U.S. Cl. ....................................... 382/165; 382/218
(58) Field of Search ................................. 382/162, 165, 382/164, 173, 181, 220, 218, 284; 209/576, 580, 581; 358/1.9, 515, 520, 530; 356/71

(56) References Cited

U.S. PATENT DOCUMENTS

| 4,278,538 | A | * | 7/1981 | Lawrence et al. | .......... 209/580 |
| 4,488,245 | A | * | 12/1984 | Dalke et al. | ................ 382/167 |
| 5,058,325 | A | * | 10/1991 | Pineau | ....................... 451/317 |
| 5,339,963 | A | | 8/1994 | Tao | ............................. 209/581 |
| 5,432,545 | A | | 7/1995 | Connolly | ...................... 348/91 |
| 5,531,331 | A | * | 7/1996 | Barnett | ........................ 209/580 |
| 5,533,628 | A | | 7/1996 | Tao | ............................. 209/580 |
| 6,381,294 | B1 | * | 4/2002 | Britton | ........................ 377/7 |
| 6,388,767 | B1 | * | 5/2002 | Udagawa et al. | ............ 358/1.9 |
| 6,441,923 | B1 | * | 8/2002 | Balasubramanian et al. | ..... 358/3.23 |
| 6,567,159 | B1 | * | 5/2003 | Corech | ........................ 356/71 |

FOREIGN PATENT DOCUMENTS

| GB | 2254419 A | * | 6/1991 | .......... B07C/5/342 |
| JP | 253359 | * | 6/1994 | ............. G01J/3/46 |
| JP | 229516 | * | 7/1995 | .......... B07C/5/342 |

* cited by examiner

Primary Examiner—Andrew W. Johns
Assistant Examiner—Amir Alavi
(74) Attorney, Agent, or Firm—Morrison & Foerster LLP

(57) ABSTRACT

A method of recognizing and detecting colors is disclosed, to allow recognition and sorting of objects. Pixels of a color image of an object to be recognized are received, the hue, intensity and/or saturation of each pixel is determined, the hue, intensity and/or saturation of each received pixel is allocated to a plurality of predetermined hue, intensity and/or saturation bands respectively to obtain hue, intensity and/or saturation distribution values respectively for the color image, and the distribution values for the color image are compared with the distribution values from one or more reference objects to determine if the object is recognized as a said reference object. This method of object recognition is independent of the image complexity and the number of colors on the object to be recognized. The method operates to compare a hue signature of the object to be recognized with a hue signature of a reference object.

30 Claims, 3 Drawing Sheets

METHOD OF DETECTING OBJECTS

This application is a 35 U.S.C. §371 filing of International Patent Application No. PCT/GB99/00980 filed Mar. 29, 1999. This application claims priority benefit of Great Britain Patent Application No. 9810771.7, filed May 19, 1998.

This invention relates to a method of detecting colours, and particularly, but not exclusively, to such a method for detecting and subsequently sorting differently coloured gaming chips.

Sorting systems for sorting articles as they move along a conveyor belt are well known. Typically, such systems have been employed to sort and reject fruit and vegetables by their colour (indicative of ripeness), to sort bottles for recycling by glass or plastic colour, and to sort gaming chips in casinos, different chips being differently coloured.

One known technique for sorting by colour uses a spectral analysis of the article. For example, a camera is employed to obtain an image of the article, which is then digitized and spectrum analysed.

Several techniques have been proposed to improve the sorting speed and reduce the number of incorrectly identified articles. For example, the system described in U.S. Pat. No. 4,278,538 detects spectral intensity through a three element sensor. U.S. Pat. No. 4,488,245 shows a system for detecting colour by defining a volume in red-green-blue (RGB) colourspace with RGB intensity values on the three axes x, y and z. The interrelation of the colour elements is used to separate articles. A similar system is employed in U.S. Pat. No. 5,058,325, and a threshold analysis of an RGB histogram is carried out.

U.S. Pat. No. 5,432,545 shows an apparatus for sorting coloured bottles. An image of each bottle is obtained in Red-Green-Blue format and is then converted into Hue-Saturation-Intensity format. A histogram of the hues in the image is formed and a peak in the histogram is determined. The value of the peak is compared with reference values to determine the colour of each bottle.

U.S. Pat. No. 5,339,963 shows an apparatus for sorting fruit. As well as using the peak hue in the hue histogram, a composite hue value is also obtained. Each value is compared with a corresponding preset value to obtain a decision on whether a match is, or is not, present.

Finally, JP-A-8-229516 and JP-A-7-253359 each show an apparatus for sorting coloured bottles. An image in Hue-Saturation-Intensity format is obtained and the hue is divided into a plurality of hue bands. A decision on colour matching is based upon a comparison of the magnitude of a plurality of the hue bands with preset threshold values.

Although the prior art described above is suitable for discriminating singly coloured objects (such as green or brown bottles), severe difficulties arise when there is an array of colours in the objects to be sorted. For example, articles to be sorted can often become dirty which will affect their "colour" as detected by a video camera. Articles such as bottles and gaming chips can also fade over time necessitating the introduction of lower present threshold values for detection in the prior art techniques. Even more importantly, none of the prior art techniques is able to handle multi-coloured articles satisfactorily. Bottles with large labels, heavily variegated fruit or gaming chips having multi-coloured pictures thereon are all difficult or impossible to sort accurately with the foregoing techniques.

It is therefore an object of the present invention to provide an improved colour detection apparatus.

According to a first aspect of the present invention, an object recognition method and apparatus is provided in which pixels of a colour image on an object to be recognised are received, the hue, intensity and/or saturation of each pixel is determined, the hue, intensity and/or saturation of each received pixel is allocated to a plurality of predetermined hue, intensity and/or saturation bands respectively to obtain hue, intensity and/or saturation distribution values respectively for the colour image, and the distribution values for the colour image are compared with the distribution values from one or more reference objects to determine if the object is recognised as a said reference object.

This method of object recognition is independent of the image complexity and the number of colours on the object to be recognised. The method operates to compare a hue signature of the object to be recognized with a hue signature of a reference object. Thus the colour pattern of an object can be matched with the colour pattern of a reference object.

The method is also independent of object orientation. The method is particularly advantageous when identifying objects such as items of fruit or coloured bottles, as the hue of such objects is not significantly affected by dirt or grease thereon. This is to be contrasted with the use of R,G,B colour space, where each of the values R, G and B will change as the object becomes dirty.

Because the method relies upon comparing numbers for a plurality, such as 360, hue bands, the position of each pixel is irrelevant. Thus, the comparison may be carried out relatively swiftly. Moreover, because a correlation technique is employed as opposed to a threshold comparison, the actual number of pixels allocated to each hue hand is irrelevant. It is the shape of the histogram rather than its height which is matched to a preset "colour signature" to obtain a probability of colour match.

In accordance with the present invention, any method of comparing the distribution values for the colour image with the distribution values for one or more reference objects can be used. Such techniques would be apparent to a skilled person in the art. For example, the distribution values can be considered to form an n-dimensional feature vector where n is the number of bands and the comparison can be achieved by feature vector matching techniques, e.g. by measuring the Euclidean distance between the vectors. The object can then be recognised as a reference object depending upon the distance between the feature vectors for the reference object and the object to be recognised.

According to an aspect of the present invention, there is provided a method of object recognition by colour, comprising receiving, as a plurality of object pixels, a colour object image of an object to be recognised, allocating the object pixels into a plurality of predetermined hue bands, and comparing the numbers of object pixels in each said hue band with corresponding numbers for reference pixels representing a reference object, to generate a hue correlation representative of the probability that the object to be recognised matches the reference object.

It is to be understood that the term "correlation" refers generally to the extent that the reference object matches the object to be identified. The term should therefore not be construed only in the strict mathematical sense. Furthermore, the term "probability" refers generally to a measure of the extent to which the object to be recognised matches the reference object and therefore should not be construed only in a strict mathematical sense.

Preferably, the method further comprises allocating the object pixels into a plurality of predetermined pseudo saturation bands, and comparing the numbers of object pixels in each said pseudo saturation band with corresponding numbers for reference pixels representing the reference object, to generate a pseudo saturation correlation representative of the probability that the object to be recognised matches the reference object.

Although the recognition of an object to be sorted can be carried out simply on the basis of pixel hue, using the pseudo saturation of the pixels as well can assist in object identification. This is particularly the case when the object to be recognised contains a large quantity of white, black or grey colours.

Strictly, the term "saturation" refers to the purity of a hue, that is, the freedom from white. Saturation according to this definition is referred to throughout the specification and claims as "true saturation". However, true saturation is dimensionless, and white, black and grey scales all have a true saturation of zero. Also, true saturation does not vary with brightness. Therefore, in the following description and claims, the term "pseudo saturation" is also employed. Pseudo saturation is a measure of true saturation, but with a contribution from intensity. In the present case, pseudo saturation takes into account the true saturation as well as the magnitude of white. Mathematically, pseudo saturation is defined as n−min (R,G,B), where min (R,G,B) is the amount of white (on a scale of 0 to n) in a colour having a particular hue. Typically, n ranges between 0 and 255.

For example, in R,G,B colour space, the colour pink is represented as (255, 100, 100) which is made up of fully saturated red (255, 0, 0) together with white (100, 100, 100). Thus, for pink, min (R,G,B) is 100.

Preferably, the pseudo saturation and hue correlations are combined, to provide an overall matching correlation. In particular, a weighted average may be employed. Weighting the average towards the hue correlation improves the ability to recognise correctly such objects as items of fruit, casino chips or coloured bottles, for example, when they are dirty.

In an alternative embodiment, the true saturation of each pixel may be allocated to one of a plurality of true saturation bands for both reference and object images.

Whether true or pseudo saturation correlations are generated, the pixels may also be allocated to one of a plurality of intensity bands for both reference and object images. Intensity correlation can thus also be obtained.

Preferably, the method further comprises comparing, for each of a further plurality of reference objects, the numbers of reference pixels in each said hue band with the corresponding numbers for the object pixels, to generate a further plurality of hue correlations representative of the probability that the object to be recognised matches each of said further reference objects, and determining which of the reference objects has the closest hue correlation with the object to be recognized.

Thus, it is possible to discriminate between a plurality of reference objects and decide which reference object provides the closest match, based upon a comparison of the number of object pixels in the various hue bands with the number of reference image pixels in each hue band for each reference image. Again, comparison of pseudo saturation bands or, alternatively, comparison of true saturation bands, and intensity bands, can be employed as well, to improve discrimination. Furthermore, a threshold correlation may be generated, the object being recognised if the closest hue or pseudo saturation correlations are larger than the said threshold correlation, or being rejected as unrecognised if smaller than the said threshold correlation. After discrimination, the object may be sorted into one of a plurality of groups of recognised objects, or sorted into a group of unrecognised objects.

According to a further aspect of the present invention, there is provided a method of object recognition by colour comprising receiving, as a plurality of object pixels, a colour object image of an object to be recognised, allocating the object pixels into a plurality of predetermined pseudo saturation bands, and comparing the numbers of object pixels in each said pseudo saturation band with corresponding numbers for reference pixels representing a reference object, to generate a pseudo saturation correlation representative of the probability that the object to be recognised matches the reference object.

In yet a further aspect of the invention, there is provided a method of object recognition by colour comprising receiving, as a plurality of object pixels, a colour object image of an object to be recognised, allocating the object pixels into a plurality of predetermined intensity bands, and comparing the numbers of object pixels in each said intensity band with corresponding numbers for reference pixels representing a reference object, to generate an intensity correlation representative of the probability that the object to be recognised matches the reference object.

The invention also extends to an apparatus for recognising objects which employs such methods. The apparatus preferably comprises means for receiving the plurality of object pixels and the or each plurality of reference pixels, memory means for storing the numbers of the reference pixels in the plurality of hue bands, a first comparator for comparing the numbers of object pixels in each said hue band with the corresponding numbers for the reference pixels, and means for outputting in dependence upon the or each hue correlation. The memory means may also store the numbers of the reference pixels in the plurality of pseudo saturation bands. In this case, the apparatus may further comprise a second comparator for comparing the numbers of object pixels in each said pseudo saturation band with the corresponding numbers for the reference pixels.

The invention may also be put into practice using software. Thus, the invention extends to a storage medium for storing instructions to control a processor to carry out the above methods.

According to yet a further aspect of the present invention, there is provided a method for sorting gaming chips according to their colour, comprising receiving, as a plurality of object pixels, a colour object image of a gaming chip to be sorted, allocating the object pixels into a plurality of predetermined hue bands, and comparing the numbers of object pixels in each said hue band with corresponding numbers for a plurality of groups of reference pixels representing a plurality of differently coloured reference gaming chips, to generate a plurality of hue correlations representative of the probabilities that the gaming chip to be recognised matches each reference gaming chip, and determining which of the reference gaming chips has the closest hue correlation with the gaming chip to be recognised.

This method preferably further comprises allocating the object pixels into a plurality of predetermined pseudo saturation bands, comparing the numbers of object pixels in each said pseudo saturation band with corresponding numbers for the plurality of groups of reference pixels representing the plurality of differently coloured reference gaming chips, to generate a plurality of pseudo saturation correlations representative of the probabilities that the gaming chip to be recognised matches each reference gaming chip, and determining which of the reference gaming chips has the closest pseudo saturation correlation with the gaming chip to be recognised.

It is to be understood that, in fact, advantages are obtained by employing hue histogram comparisons, true saturation histogram comparisons, intensity histogram comparisons or pseudo saturation histogram comparisons, either alone or in any combination. Further, an apparatus operating according to any of these comparisons, again either alone of in any combination, is advantageous.

One example of the invention will now be explained with reference to the accompanying drawings, in which.

It will be understood that this description is for the purposes of illustration only, and that the details of the hardware used to implement the preferred method of detecting colours will, in general, vary depending upon the object to be detected. Indeed, the invention may be put into practice using software.

Figure 1:
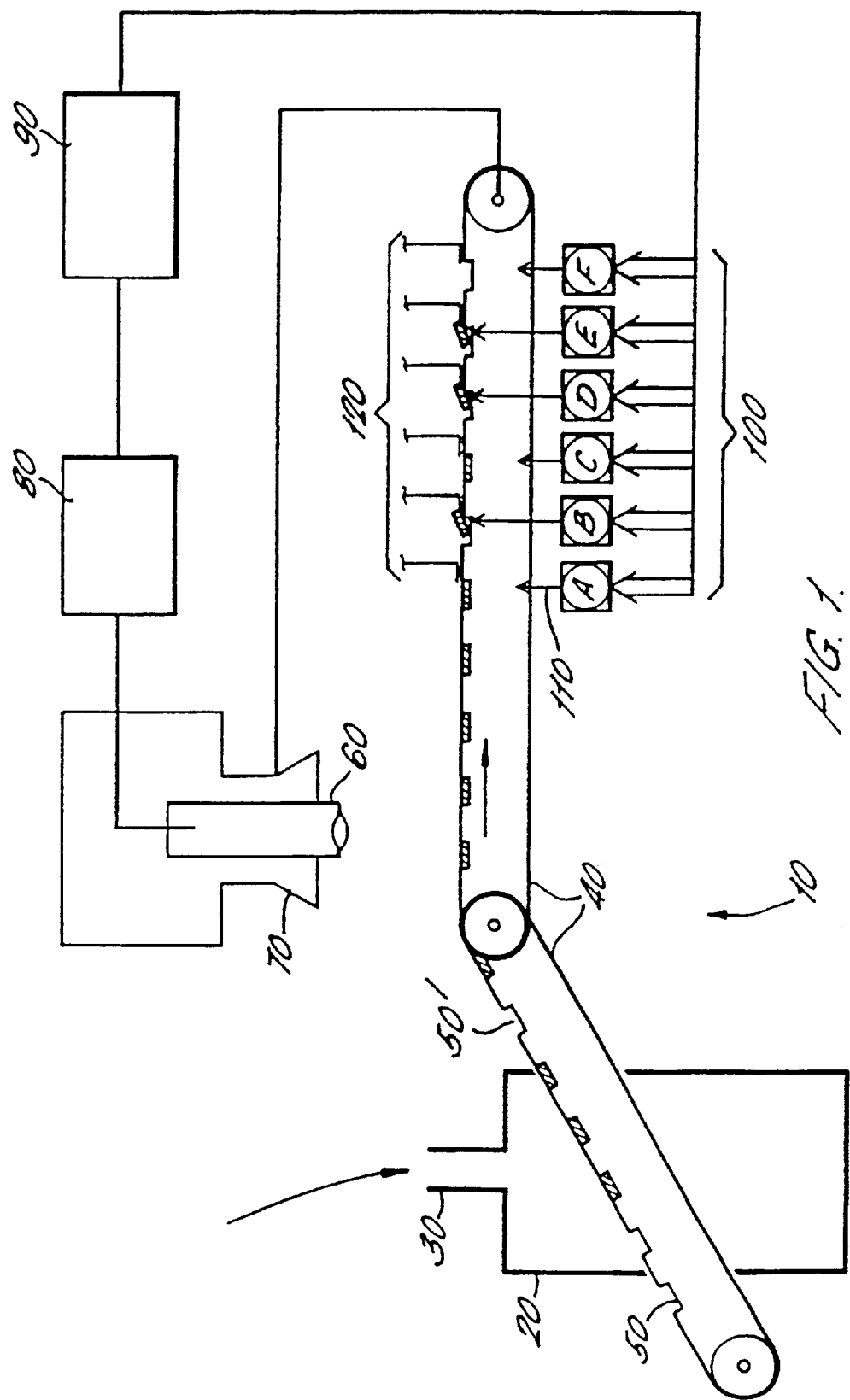
FIG. 1 shows an overview of a sorting apparatus for sorting gaming chips.

The apparatus shown in FIG. 1 sorts gaming chips in a casino. As is well known, such chips are typically circular and have a diameter of about 4 cm. The chips are differently coloured to represent different players around a table in a casino. Furthermore, the casino may use "value chips", which have a direct monetary value and tend to have a more elaborate range of colours and designs. During use by visitors to the casino, the differently coloured chips become mixed together, and it is a labourious task to separate such chips into stacks of different colours/values manually. Thus, colour recognition systems have been developed which detect the colour of individual chips and sorts them accordingly. An early chip sorting machine is described in GB 1,571,219 and GB 1,571,220. Four photo diodes are employed, with four filters (red, green, blue and yellow). A halogen lamp is used to illuminate chips as they pass below the photodiodes. An individual point on the chip is measured by the photodiodes whose electronic response is compared to a stored electronic photodiode response from a reference chip.

An improvement to such a method is shown in WO 96/34258. Here, the number of photodiodes is expanded to a 64 diode linear array with a diffraction grating to generate a rudimentary frequency spectrum.

Finally, GB 2,254,419 describes a different system for sorting chips. This device employs a charge coupled device to derive a digital image of the chips to be sorted.

There are several difficulties in sorting chips by colour. Firstly, the known algorithms for colour detection and discrimination have difficulty handling black, white or grey scale chips, for reasons which will be explained below. Secondly, and more importantly, known colour recognition systems have difficulty handling multi-coloured chips, such as "value" chips which typically comprise a single colour around the circumference of the chip, with a complex, multi-coloured pattern in the centre of the chip, (such as a casino's logo or a photograph). The difficulty in recognising the chips arises predominantly from the (usually random) orientation of the chip relative to the colour recognition system. The colour recognition system sees a different coloured chip, depending upon the orientation of that chip relative to the detectors.

The other problem which affects known chip sorting apparatus is that chips become dirty over a period of time. Such chips, are often incorrectly sorted in the chip sorting system of the prior art, such as those described above.

FIG. 1 shows schematic diagram of a chip sorting system 10, employing a preferred embodiment of the colour recognition method of the present invention. The system 10 includes a hopper 20 having an entrance funnel 30, into which chips to be sorted are placed.

A conveyor belt 40 passes through the hopper 20. The conveyor belt 40 contains a plurality of cups 50, mounted upon the surface of the belt 40. As the belt 40 moves through the hopper 20, so chips in the hopper are scooped up into the cups 50 thereon.

In order for the contents of each cup to be recognisable, it is naturally important that each cup 50 contains only one chip. Thus, the part of the belt 40 which passes through the hopper 20 is arranged on an incline, as shown in FIG. 1. The cups are so shaped and sized that, if two chips are scooped up by any given cup 50, the upper one will roll out and backwards down the slope.

As well as two chips sometimes initially being scooped up into one cup, some cups (such as the one marked 50' in FIG. 1) may fail entirely to capture a chip. The colour recognition technique is able to is recognise when cups are empty.

Mounted above the conveyor belt, downstream from the hopper 20, is a video camera 60. The lens of the video camera 60 is pointed towards the cups 50 on the belt 40. A xenon stroboscope 70, associated with the video camera 60, illuminates the cups 50 on the belt 40. The camera 60 is arranged generally perpendicular to the belt 40. However, the stroboscope 70 is mounted at approximately 45° to the belt 40, to avoid direct reflections.

The stroboscope 70 is synchronized to the velocity of the belt 40, such that the resulting image obtained by the camera 60 from the moving belt appears stationary (that is, in the same position every time an image is acquired). Although the stroboscope and belt are synchronized, the camera 60 runs asynchronously to the belt 40. Thus, the precise timing of the stroboscope 70 may be delayed by several video lines if the cup to be imaged is in position when the camera is in between consecutive field exposures. This small delay is negligible in terms of freezing the motion in the same position each time. Gas discharge of xenon is conveniently used to provide the light source for the stroboscope 70. This is because xenon has a relatively broad spectrum and this in turn permits hues throughout the majority of the visible spectrum to be identified.

Each image obtained by the video camera 60 is captured by a video frame grabber 80 which digitizes the video image. To reduce processing time for this image, a target area within the whole image frame is extracted. In the present example, this is a circle representative of the gaming chip. Of course, for other applications, other shaped target areas may be employed.

The extracted target area image is sent to a processor 90. The processor 90 converts the target area image into hue, saturation and intensity (HSI) format for further analysis. For rapid conversion to HSI format, it is preferable that the camera image is provided from the frame grabber 80 in luminance and chrominance ($YC_bC_r$)format. This is because conversion from $YC_bC_r$ format to HSI format may be done using a lookup table to implement the required arctan mathematical function. Although red-green-blue (RGB) format video data could be supplied to the frame grabber instead, this would increase the processing time of the processor 90.

The processor uses the HSI information, in a manner to be described below, to identify the chip according to its colour signature. Once the chip has been identified, the processor 90 sends a signal to a plurality of solenoids 100. Each solenoid is in engagement with a cam (not shown), located beneath the surface of the belt 40. The solenoids are synchronized with the motion of the belt and the cam operates a plurality of spring ejector pins 110 which in turn move upwards, into contact with the cups 50, when the respective solenoid 100 receives a signal from the processor 90. As the pin 110 moves upwards, it lifts the chip in its associated cup 50.

Associated with each of the solenoids 100 is a corresponding chip collector 120. Each of the chip collector 120 has a lip adjacent to the belt 40. Thus, as one of the solenoids 100 moves its corresponding pin 110 upwards, the raised chip is captured by the lip of the corresponding chip catcher 120, which captures the chosen chip and places it in one of a plurality of chip stacks. Each stack generally contains chips of one colour scheme, or one predetermined group of colour schemes, only. However, one of the stacks is generally employed to collect reject chips, that is, chips whose colour cannot be adequately matched to that of any of the reference chips.

The manner in which the processor controls the solenoids 100 to sort the chips does not form part of the present invention, and will not be described in further detail.

The algorithm employed in the processor 90, to identify the chips by their colour, will now be explained in more detail.

HSI is the preferred colour space, in this example, as the hue content of chips tends to remain relatively constant as such chips become 'faded' with age, or become dirty. Furthermore, the hue content of chips is not altered significantly by the intensity of illumination by the stroboscope 70.

On the other hand, both true and pseudo saturation, and intensity, are affected by dirt and stroboscope intensity. However, pseudo saturation and intensity information in particular is useful to distinguish between white, black and greyscale chips (or, alternatively, pseudo saturation can be used).

By convention, white, black and greyscale chips are each mapped to a fixed hue angle.

Before chip sorting can begin, the processor must first learn the colour signatures of each of the differently coloured chips to be sorted. To do this, the machine is switched into "programme mode". A number of differently coloured chips, to be used as reference chips, are placed into the hopper 20. Once the machine enters "programme" mode, it first obtains an image of an empty cup 50.

It is important that the camera be properly is focussed upon the cups, and that the focus remains relatively constant. Otherwise, for example, individual red or green dots in the image may be seen as monochromatic yellow.

The video frame grabber 80 captures the image, converts it to a series of pixels and passes it to the processor 90 in a manner previously described. If necessary, the plurality of pixels are converted from $YC_bC_r$ format to HSI format. During conversion, very low intensity pixels are mapped to a fixed hue angle to avoid introduction of noise errors to the hue data. Next, histograms of hue and pseudo saturation are constructed within the processor 90.

The dynamic range of each pixel is 9 bits (0 to 511) for hue, representative of 0 to 359 degrees of hue. For example, the whole visible spectrum is divided into 360 hues, with 0° representing red, 120° representing green, and 240° representing blue. Each pixel will also have a dynamic range of 8 bits (0 to 255) for true saturation and intensity. As explained above, the dynamic range of pseudo saturation is also 0 to 255 and 8 bits are thus employed. 32 bit integers are used for the histogram values.

In the preferred embodiment, two histograms are generated, one comprising hue (0 to 359°) versus number of pixels having a given hue, and one comprising pseudo saturation (0 to 255) versus number of pixels having a given amount of pseudo saturation. Thus, the empty cup provides two signature histograms.

These two histograms are stored in separate addresses within a volatile memory in the processor 90. The histograms may also be output to a non-volatile storage device such as a floppy disk. External storage of the histograms allows the apparatus to be powered off and on again without having to reprogramme it. Meanwhile, a first reference chip, in a cup on the moving belt, moves into a location under the camera, and a first reference image is obtained. First reference hue, and pseudo saturation histograms are obtained as with the empty cup histograms, and stored at further addresses in the memory of the processor 90.

The belt 40 continues to move past the camera 60 and the sequence of events is repeated until all the different coloured chips have been imaged, and their histograms stored. As each reference chip's colour signature is obtained, its hue and pseudo saturation histograms are compared with those of the empty cup to ensure that duplicate empty cup histograms are not stored.

Figure 2A:
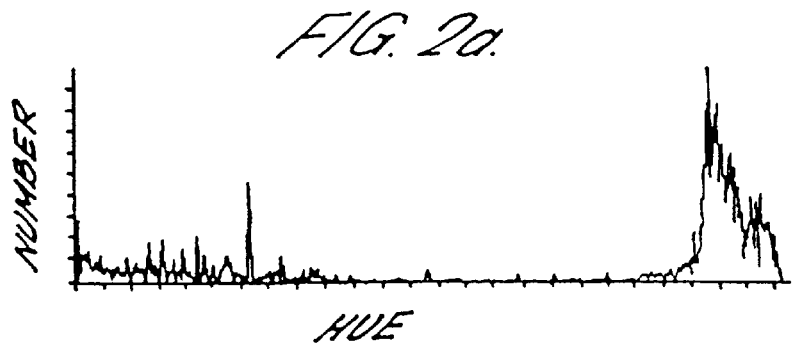
FIGS. 2a to 2d show exemplary histograms of the hue and saturation of such gaming chips.
Figure 2B:
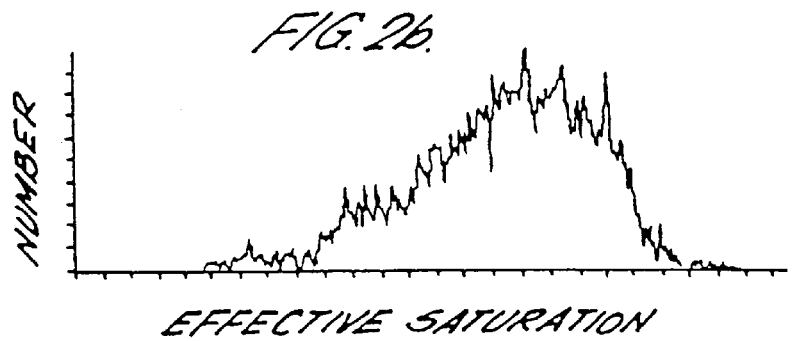
Figure 2C:
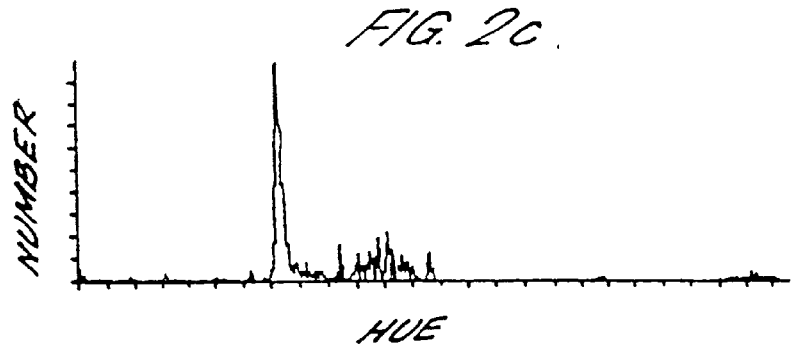
Figure 2D:
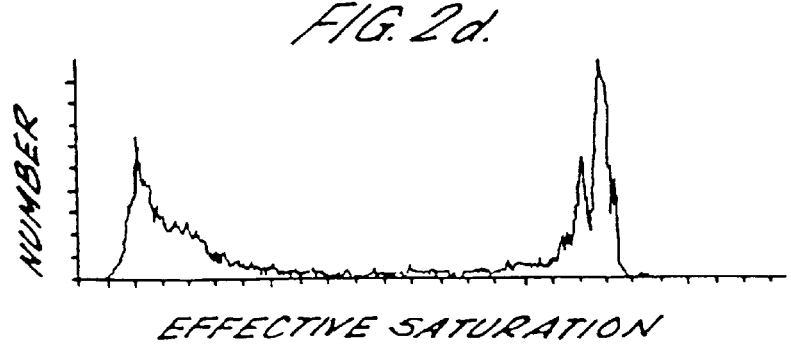

Each reference chip will have its own unique reference histograms, regardless of the complexity of the colours upon each chip. For example, a blue chip with a detailed multi-coloured pattern will have a more complex hue histogram, in particular, than a plain blue chip which has a single main peak in the hue histogram. FIGS. 2a and 2b show typical hue and saturation reference histograms for a gaming chip having a large range of colours, respectively. FIGS. 2c and 2d, on the other hand, show typical hue and saturation reference histograms for a simpler coloured chip.

Following collection of the reference histograms, the "programme mode" is exited, and the chips to be sorted are placed into the, hopper 20, where they are ejected into the cups 50 on the moving belt 40. As each cup passes beneath the camera 60, images of the cup either empty or containing a chip are taken as explained in relation to FIG. 1.

The image of a particular cup is converted to a series of pixels and also into HSI format if necessary. Hue and pseudo saturation histograms of the cup are then constructed.

The measured hue histogram is compared with each of the reference hue histograms. Independently, the measured pseudo saturation histogram is compared with the stored reference pseudo saturation histograms. This is again carried out by the processor 90.

One preferred technique for comparing the histograms is simply to subtract each reference histogram from each measured histogram, and then sum the absolute values of the difference. Generally:

$$V = \sum_{n=0}^{N} |H_n - R_n|$$

where N is the number of degrees of freedom within the histogram, $H_n$ is the number of pixels having a hue n within the measured image, and $R_n$ is the number of pixels having a hue n within a given reference image. Generally, for example, if each pixel hue is allocated to one of 360 hues, then N=359.

The value V calculated this way is, however, only meaningful when $H_n = R_n$ for all N, whence V=0. This indicates an exact match.

S Usually, a 100% match is not achieved. There are many reasons for this. Most commonly, the reason is that the intensity of the stroboscope 70 is not constant. Other factors include the variations in chip colour due to manufacturing tolerances, or dirt on the chip, and electronic noise within the imaging system. Thus, a percentage correlation Z(0%<Z, <100%) is calculated.

V is scaled to give a percentage between 0% and 100% by defining a zero percent matching chip colour as a histogram of random pixel hues or pseudo saturations having the same number of pixels as the measured image. Such a histogram may be approximated, for a large number of pixels, as a horizontal line. Mathematically, $$Z' = \sum_{n=0}^{N} |H_n - A|$$

and $$A = \frac{1}{N}\left[\sum_{n=0}^{N} R_n\right]$$

This may be linearly interpolated to calculate Z, where Z=100% when V=0, and Z=0% when V=Z' or less.

If only coloured chips are to be sorted, then typically a match percentage may be adequately obtained from the hue histograms only. However, it is often the case that chips contain amounts of white, black or greys, or indeed the chips may be either wholly black or wholly white. A hue histogram alone cannot distinguish between chips that are solely white, black or varying shades of grey, as each of these is mapped to the same hue value (although at different intensities) upon conversion to HSI format.

Thus, to avoid erroneous matching of, say black chips with white chips, a combination of the hue matching percentage and the pseudo saturation matching percentage is calculated. Again depending upon processor speed, many ways of combining the two matching percentages may be used. The most straightforward is $$M_1 = \left(\frac{H \times S}{100}\right)$$

where H is the hue matching percentage and S is the pseudo saturation matching percentage. Hence, a measured chip that is wholly white in colour would have H=100% and S=0% when compared with a black reference chip.

The overall match $M_1$, may then be linearized as follows $$M_2 = 100 - \left[\frac{(100 - M_1)^2}{100}\right]$$

Finally, the match $M_2$ is weighted. This is to assist in the sorting of dirty chips.

$$M_3 = \left[\frac{15H + 5 \cdot S + 80 \cdot M_2}{100}\right]$$

Any chip to be sorted is compared against the reference chip histograms and allocated to one of the chip collectors 120.

It may be necessary to allocate the threshold match percentage dynamically, depending upon the similarity in colour signatures between the various reference chips. For example, if four of the reference chips contain a predominance of the same particular hue, then the match between a chip to be sorted and these four reference chips may be 70%, 40%, 60% and 90% respectively. In order to ensure that the chip is correctly sorted, it is then necessary to set a relatively high threshold (In the above example, setting a threshold of >71% would allow a correct match). Conversely, if the reference chips each have very different hues, then a lower threshold is required, as one of the reference chips will have a much higher match with the chip to be sorted than the others. For example, with matches of 10%, 10%, 90% and 20%, the threshold need be set only at 21% to ensure a correct match. In other words, each of the reference hue and pseudo saturation histograms 'competes' for the best match with the corresponding measured histograms.

If the correlations obtained between the chip to be sorted and each of the reference chips are all below the threshold correlation, then the chip is passed to the reject stack.

The confidence of match between a reference chip and a chip to be sorted will reduce as the latter becomes dirty, for example. Thus it may be useful to allocate the threshold match dynamically during each chip sorting operation. Thus, when the system identifies that the chip to be sorted is dirty, the threshold match is reduced accordingly so that this dirty chip is not rejected.

Empty cups 50 on the belt 40 are detected by matching the image of such a cup with the reference 'empty cup' image.

Operating in accordance with the method described above, approximately 550 chips per minute may be sorted. Nonetheless, several improvements to the above algorithm are possible, depending upon the speed of the processor 90. It will be understood that the processor to be chosen is a trade-off between cost, on the one hand, and speed, on the other. Of course slower processors can be utilized, but this requires the belt 40 to move more slowly and this in turn slows down the chip sorting speed.

The description above has employed only two histograms, one of which is a true hue histogram and one of which is a pseudo saturation histogram. Depending upon processor speed, however, it may be preferable to use true saturation values to generate a true saturation histogram. In order to recognize monochrome chips, however, the intensity values of the pixels may be employed as well, such that, for the image of each chip to be sorted, three histograms are generated, one for hue, one for true saturation and one for intensity. As all three such histograms must be compared with a corresponding three histograms for each reference chip, the processing time is consequently increased.

A second improvement is to normalise the pseudo saturation histograms. Typically, both pseudo saturation and intensity histograms will vary in location on the 'X' axis (see FIG. 2), due to variations in intensity of the stroboscope 70 (the stroboscope intensity variation may be as much as 5% between flashes). The stroboscope intensity variation also appears as random noise on the hue histogram.

To address the variations in the pseudo saturation histograms, part of the image field that is presented to the camera 60 has a reference pseudo saturation. This may be, for example, at the edge of each cup 50, and the reference pseudo saturation is preferably a light greyscale (which, of course, has a constant hue and relatively low pseudo saturation). Each image captured (both reference image and measured image) has its pseudo saturation shifted using the reference saturation in part of the image. It is more efficient to shift the pseudo saturation histogram, once obtained, than to attempt to scale the raw image data prior to histogram generation.

An alternative method of dealing with the problems of X-axis shift in the pseudo saturation and intensity histograms, caused by the variation in stroboscopic intensity, employs sliding correlation. The technique is shown schematically in FIGS. 3a to 3c.

Figure 3A:
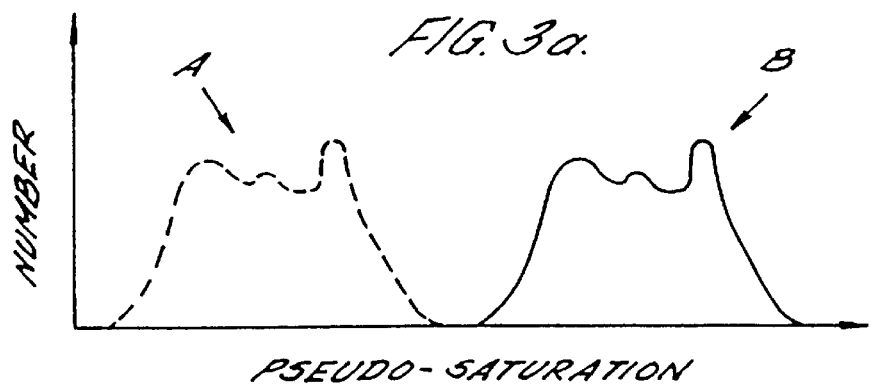
FIGS. 3a, 3b and 3c show, schematically, one technique for comparing such histograms.
Figure 3B:

In these figures, the pseudo saturation histogram of a reference chip is indicated in solid line at B, and that of an object chip to be sorted is indicated in broken line at A. The location of the reference histogram along the X axis is kept constant, whilst the location of the object chip histogram is moved along the X-axis. Once the object histogram has been obtained, the histogram is first shifted 20 pseudo saturation values to the left, for example, as shown in FIG. 3a. The reference histogram is then subtracted from the object histogram, in the manner set out above, to obtain a first percentage match.

Figure 3C:
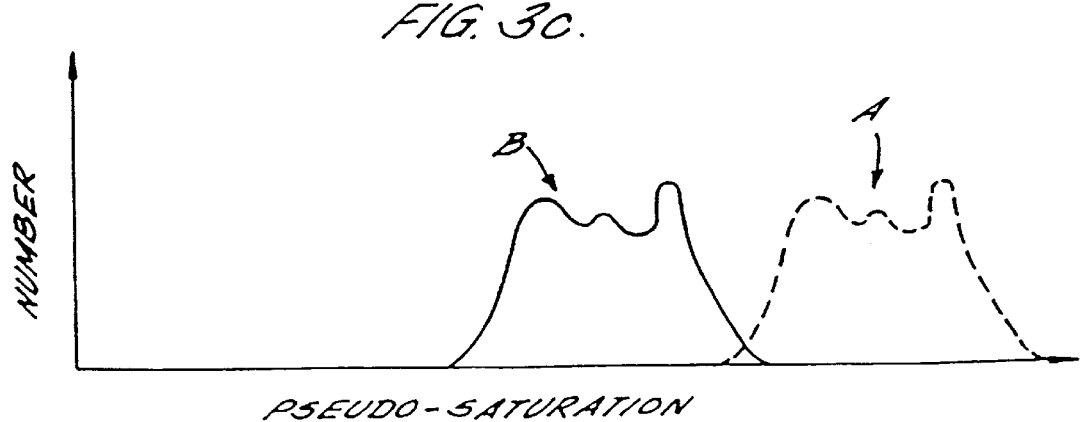

Next, each of the pseudo saturation values in the object histogram is increased by one, and the reference histogram (which has thus been shifted to the right as seen in the Figures) is again subtracted from the object histogram to obtain a second percentage match. The process continues until the object histogram has been moved 20 pseudo saturation values to the right of its initial position (FIG. 3c). Thus, the object histogram is 'slid' across the stationary reference histogram, and a maximum match percentage is ascertained. The distance (along the X-axis) over which the object histogram is slid usually needs to be constrained (in the above example it is +/−20 pseudo saturation values), to avoid an accidental match with a completely different reference pseudo saturation histogram.

This sliding correlation technique can also be used to maximise the match percentage on the hue histograms. Certain cameras, particularly cheaper ones, have instabilities in the colour balance. This has the effect of moving the hue histograms back and forth along the hue axis. By using the sliding correlation technique, the match percentage error is reduced.

Finally, it is possible to pre-process the histograms with a digital filter, such as a first order low-pass filter, to improve the histogram matching.

Whilst a preferred embodiment has been described in terms of hardware, it will be understood that the algorithm may equally be put into practice using software controlling a personal computer, for example.

Furthermore, although a gaming chip sorter has been described, it will be appreciated that other applications of the colour recognition algorithm are envisaged. For example, a motion detector can be readily constructed for use with a colour video security system. Any change at all in stored hue and saturation histograms (which are derived from an image of the room or other space when empty) can indicate an intruder's presence. Such a technique can even be extended to infra-red cameras, the hue angle being defined across the infra-red part of the electromagnetic spectrum. This would allow the alarm to operate in the dark.

Similarly, fire or smoke will generate a change in colour and hence in hue and saturation, and thus the algorithm described above may be used in a fire or smoke detector having video imaging.

The colour detection system also permits detection of television adverts, when these are preceded by a distinctive logo on screen. By overwriting such a logo on programmes deemed unsuitable for children, the detection system may detect and automatically cut off such programmes. The weather may be detected using this technique as well; blue sky, rain and atmospheric air quality all have unique colour signatures.

Sorting of other objects is also envisaged. Fruit may be sorted by ripeness, ripe fruit having a different colour signature to unripe fruit. In this case, because the fruit is three dimensional, it is preferable to employ two or more cameras at different angles to the conveyor belt along which the fruit passes. This allows the fruit to be imaged from more than one direction to improve the confidence of matching. Coloured bottles can also be sorted in this way. Paper production can be monitored, as can wood quality and print quality on a printing press.

Finally, by employing aerial photography, environmental analysis of forests can be carried out, as well as automatic ripeners indications of wheat/grain fields. Higher distance aerial photographs can permit rapid quantitative analysis of urban development versus "green areas".

What is claimed is:

1. A method of object recognition by colour comprising:
   receiving, as a plurality of object pixels, a colour object image of the object to be recognised;
   allocating the object pixels to a plurality of predetermined hue bands;
   allocating the object pixels to at least one of a plurality of intensity bands, a plurality of saturation bands, and a plurality of pseudo saturation bands; characterised by:
   comparing the numbers of object pixels in each said hue band with corresponding numbers for reference pixels representing a reference object to generate a hue correlation;
   comparing the numbers of object pixels in each said intensity, saturation and/or pseudo saturation band with corresponding numbers for reference pixels representing a reference object to generate a respective intensity, saturation and/or pseudo saturation correlation; and
   combining said generated correlations to generate a combined correlation representative of the probability that the object to be recognised matches the reference object.

2. The method as claimed in claim 1, wherein said combined correlation is generated by averaging said generated correlations.

3. The method as claimed in claim 2, wherein said combined correlation is generated by taking a weighted average of said generated correlations.

4. The method as claimed in claim 1, wherein said predetermined hue bands are predetermined by dividing all of the visible spectrum into 360 separate hue bands.

5. The method as claimed in claim 1, wherein said comparing steps are repeated for each of a plurality of reference objects to generate a respective plurality of hue and intensity, saturation and/or pseudo saturation correlations and said combining step is repeated for each of said plurality of reference objects to generate a respective combined correlation; the method including recognising the object by determining which of said reference objects has the closest combined correlation with the object.

6. The method as claimed in claim 5, wherein said object is recognised as a said reference object when said combined correlation is larger than a threshold correlation.

7. The method as claimed in claim 6, wherein said object is rejected as not being recognised as a said reference object when said combined correlation is smaller than said threshold.

8. The method as claimed in claim 1, further comprising:
   employing sliding correlation between the numbers of object pixels in each said intensity, saturation and/or pseudo saturation band and the corresponding numbers for the said reference pixels representing the reference object to generate the respective intensity, saturation and/or pseudo saturation correlation.

9. The method of sorting objects comprising the method of object recognition by colour as claimed in claim 1 for recognising objects; and further comprising:
sorting objects according to the result of the recognition.

10. A method of sorting objects according to their colour, comprising:
receiving, as a plurality of object pixels, a colour object image of each of a plurality of reference objects of different colours;
allocating the object pixels into a plurality of predetermined hue bands and at least one of a plurality of predetermined intensity bands, saturation bands and pseudo saturation bands to generate a reference hue distribution and a respective reference intensity, saturation and/or pseudo saturation distribution for each said reference object;
receiving as a plurality of object pixels, a colour object image of each of a plurality of objects to be recognised;
allocating the object pixels to said plurality of predetermined hue bands and at least one of said plurality of predetermined intensity bands, saturation bands and pseudo saturation bands; characterised by:
comparing the number of object pixels in each said hue band for the objects to be recognised with the number of object pixels in each said hue band for the reference objects to generate a respective hue correlation for each object to be recognised with respect to each reference object;
comparing the number of object pixels in each said intensity, saturation and/or pseudo saturation band for the objects to be recognised with the number of object pixels in each respective said intensity, saturation and/or pseudo saturation band for the reference objects to generate a respective intensity, saturation and/or pseudo saturation correlation for each object to be recognised with respect to each reference object;
combining said generated correlations for each object to be recognised with respect to each reference object to generate combined correlations representative of the probability that the objects to be recognised match the reference objects; and
sorting said objects to be recognised in accordance with the probability that the objects match the reference objects.

11. The method as claimed in claim 10, wherein each combined correlation is generated by averaging the relevant generated correlations for each object to be recognised with respect to each reference object.

12. The method as claimed in claim 11, wherein each combined correlation is generated by taking a weighted average of the relevant generated correlations.

13. The method as claimed in claim 10, wherein said predetermined hue bands are predetermined by dividing all of the visible spectrum into 360 separate hue bands.

14. The method as claimed in claim 10 wherein a particular one of said objects to be recognised is recognised as a particular one of said reference objects when the relevant combined correlation is larger than a threshold correlation.

15. The method as claimed in claim 14, wherein a particular one of said objects to be recognised is rejected as not being recognised as a particular one of said reference objects when the relevant combined correlation is smaller than said threshold.

16. The method as claimed in claim 10 further characterised by:
employing sliding correlation between the numbers of object pixels in each said intensity, saturation and/or pseudo saturation band and the corresponding numbers for the said reference pixels representing any one of said reference objects to generate the respective intensity, saturation and/or pseudo saturation correlation.

17. An apparatus for object recognition by colour, comprising:
a receiving element for receiving, as a plurality of object pixels, a colour object image of an object to be recognised;
a first allocating element for allocating the object pixels to a plurality of predetermined hue bands;
a second allocating element for allocating the object pixels to at least one of a plurality of intensity bands, a plurality of saturation bands, and a plurality of pseudo saturation bands;
a first comparing element for comparing the numbers of object pixels in each said hue band with corresponding numbers for reference pixels representing a reference object to generate a hue correlation;
a second comparing element for comparing the numbers of object pixels in each said intensity, saturation and/or pseudo saturation band with corresponding numbers for reference pixels representing a reference object to generate a respective intensity, saturation and/or pseudo saturation correlation; and
a combining element for combining said generated correlations to generate a combined correlation representative of the probability that the object to be recognised matches the reference object.

18. The apparatus as claimed in claim 17, wherein said combining element is adapted to generate said combined correlation by averaging said generated correlations.

19. The apparatus as claimed in claim 17, wherein said combining element is adapted to generate said combined correlation by taking a weighted average of said generated correlations.

20. The apparatus as claimed in claim 17 including an element for predetermining said predetermined hue bands by dividing all of the visible spectrum into 360 separate hue bands.

21. The apparatus as claimed in claim 17 wherein said first and second comparing elements are adapted to repeat the comparison for each of a plurality of reference objects to generate a respective plurality of hue and intensity, saturation and/or pseudo saturation correlations, and said combining element is adapted to repeat the combining for each of said plurality of reference objects to generate a respective combined correlation; the apparatus including an element for recognising the objects by determining which of said reference objects has the closest combined correlation with the object.

22. The apparatus as claimed in claim 21, wherein said recognising element is adapted to recognise said object as a said reference object when said combined correlation is larger than a threshold correlation.

23. The apparatus as claimed in claim 22, wherein said recognising element is adapted to reject said object as not being recognised as a said reference object when said combined correlation is smaller than said threshold.

24. An apparatus for sorting objects according to their colour, the apparatus comprising:
a receiving element for receiving, as a plurality of object pixels, a colour object image of each of a plurality of reference objects of different colours;
a first allocating element for allocating the object pixels into a plurality of predetermined hue bands and at least one of a plurality of predetermined intensity bands, saturation bands and pseudo saturation bands, to generate a reference hue distribution and a respective reference intensity, saturation and/or pseudo saturation distribution for each said reference object;

means for receiving, as a plurality of object pixels, a colour object image of each of a plurality of objects to be recognised;

second allocating means for allocating the object pixels to said plurality of predetermined hue bands and at least one of said plurality of predetermined intensity bands, saturation bands and pseudo saturation bands; characterised by:

a first comparing element for comparing the number of object pixels in each said hue band for the objects to be recognised with the number of object pixels in each said hue hand for the reference objects to generate a respective hue correlation for each object to be recognised with respect to each reference object;

a second comparing element for comparing the number of object pixels in each said intensity, saturation and/or pseudo saturation band for the objects to be recognised with the number of object pixels in each respective said intensity, saturation and/or pseudo saturation band for the reference objects to generate a respective intensity, saturation and/or pseudo saturation correlation for each object to be recognised with respect to each reference object;

a combining element for combining said generated correlations for each object to be recognised with respect to each reference object to generate combined correlations representative of the probability that the objects to be recognised match the reference objects; and a sorting element for sorting said objects to be recognised in accordance with the probability that the objects match the reference objects.

25. The apparatus as claimed in claim 24, wherein said combining means is adapted to generate each combined correlation for each object to be recognised with respect to each reference object by averaging the relevant generated correlations for each object to be recognised with respect to each reference object.

26. The apparatus as claimed in claim 25, wherein said combining means is adapted to generate each combined correlation by taking a weighted average of the relevant generated correlations.

27. The apparatus as claimed in claim 24, including means for predetermining said predetermined hue bands by dividing all of the visible spectrum into 360 separate hue bands.

28. The apparatus as claimed in claim 24, wherein said recognising means is adapted to recognise a particular one of said objects to be recognised as a particular one of said reference objects when the relevant combined correlation is larger than a threshold correlation.

29. The apparatus as claimed in claim 28, wherein said recognising means is adapted to reject a particular one of said objects to be recognised as not being recognised as a particular reference object when said combined correlation is smaller than said threshold.

30. A carrier medium carrying computer code for object recognition by colour, the computer code comprising instructions for:

receiving, as a plurality of object pixels, a colour object image of the object to be recognised;

allocating the object pixels to a plurality of predetermined hue bands;

allocating the object pixels to at least one of a plurality of intensity bands, a plurality of saturation bands, and a plurality of pseudo saturation bands; characterised by:

comparing the numbers of object pixels in each said hue band with corresponding numbers for reference pixels representing a reference object to generate a hue correlation;

comparing the numbers of object pixels in each said intensity, saturation and/or pseudo saturation band with corresponding numbers for reference pixels representing a reference object to generate a respective intensity, saturation and/or pseudo saturation correlation; and combining said generated correlations to generate a combined correlation representative of the probability that the object to be recognised matches the reference object.

* * * * *